United States Patent [19]
Leblanc et al.

[11] Patent Number: 5,610,717
[45] Date of Patent: Mar. 11, 1997

[54] INTERFEROMETER DELAY LINE WITH AN OPTICAL PAYLOAD SUPPORTED BY AEROSTATIC PADS

[75] Inventors: Jean-Marc Leblanc, Peymeinade; Michel Sghedoni, Auribeau S/Siagne, both of France

[73] Assignee: Aerospatiale Societe Nationale Industrielle, France

[21] Appl. No.: 415,485

[22] Filed: Apr. 3, 1995

[30] Foreign Application Priority Data

Apr. 5, 1994 [FR] France ................. 94 03974

[51] Int. Cl.⁶ ........................................... G01B 9/02
[52] U.S. Cl. ................ 356/358; 356/356; 250/237 G
[58] Field of Search ..................... 356/356, 358; 250/237 G

[56] References Cited

U.S. PATENT DOCUMENTS 4,998,798  3/1991  Ishizuka et al. ............. 250/237 G
5,008,607  4/1991  Koehler et al. .

5,270,790  12/1993  Maasumura ................. 356/356

FOREIGN PATENT DOCUMENTS

0478801  4/1992  European Pat. Off. .
2292950  6/1976  France .
2346684  10/1977  France .
1773460  9/1971  Germany .

*Primary Examiner*—Frank Gonzalez
*Assistant Examiner*—Robert Kim
*Attorney, Agent, or Firm*—Remy J. VanOphem; Thomas A. Meehan; John VanOphem

[57] ABSTRACT

An interferometer delay line includes an optical payload displaced along a guide track under the control of a control device including at least one sensing device which senses the position of the payload along the guide track and a drive device acting on the payload. The sensing device includes a linear succession of fixed optical read heads parallel to the guide track and a graduated rule carried by the optical payload in any position on the latter facing at least one of the optical read heads. The sensing device also includes a synchronizing/switching unit causing a counter to count pulses from the heads in succession, the pulses representing distance increments.

11 Claims, 2 Drawing Sheets

INTERFEROMETER DELAY LINE WITH AN OPTICAL PAYLOAD SUPPORTED BY AEROSTATIC PADS

BACKGROUND OF THE INVENTION

1. Field of the Invention

The invention concerns an interferometer delay line, in particular a delay line of the type used in an interferometer device such as a FOURIER transform spectrometer in which the aim is not only to stabilize dynamically the optical component during a programmed movement, in order to eliminate the effect of vibrations, but also to compensate for disturbing optical path differences generated independently of the optical component and its movement in the remainder of the interferometer device, and even externally of the latter. The invention also concerns an optical delay line which is part of a coherent recombination stellar interferometer in which the distance (called the base) between the telescopes is in the order of 100 meters and equalizing the optical paths despite the fact that the rotation of the Earth necessitates displacement of the retroreflector device of the optical delay line over a distance of several meters, at a speed of several tens of millimeters per second, with an average positioning accuracy of a few microns and an instantaneous positioning accuracy (during a setting time of a few hundredths of a second) of a few nanometers (vibration amplitude). Thus the constraints with respect to dynamic errors are more severe than those with respect to static errors.

2. Description of the Prior Art

Similar displacement characteristics are also needed when the object is to equalize the optical paths by displacing the telescopes themselves.

European Patent 0 398 772 (KOEHLER) describes a delay line in detail. This reference describes a vibration free displacement control device for static and dynamic control of an optical component which is mobile in one direction within an interferometer device, the control device including a guide track, a carriage carrying a payload including the optical component and mobile along the guide track, a drive unit for driving the carriage along the guide track, and a drive control unit connected to the drive unit to move the carriage in accordance with a predetermined set point law. The payload is connected to the carriage by flexible connecting members allowing relative movement between the carriage and the payload parallel to the mobile direction and at least one actuator acts on at least part of the optical component under the control of at least one stabilization control loop connected to at least a second sensor. In this device the stabilization control loop is a single loop independent of the drive control unit and the second sensor is a single sensor embodying an accelerator carried by the payload which is responsive to acceleration of the payload parallel to the mobile direction. The actuator is a single actuator acting on all of the payload with its other end bearing against the carriage. The stabilization control loop includes a stage for filtering the accelerometer signal and the drive control unit includes a control loop connected to a position sensor adapted to sense the position of the carriage on the guide track.

The prior art includes position sensing devices including a fixed graduated rule and an optical head moving along the rule which is adapted to supply pulses representative of distance increments (or increments of displacement of the head relative to the rule). These heads have electronic processor devices so that the output pulses can correspond to distance increments very much smaller than the gaps between the graduations of the rule. For example, the distance increments are in the order of 15 nanometers for a distance of 4 microns between graduations.

Graduated rules of this kind cooperating with optical heads to provide a resolution as above are available only for limited lengths, typically not more than about one meter. Other rules in the form of a strip are available, in lengths up to around 30 meters, but their precision and their resolution are very much lower than the values stated above and are not compatible with the requirements of an astronomical interferometer delay line.

SUMMARY OF THE INVENTION

An object of the invention is to further improve the performance of prior art delay lines.

A first object of the invention is to measure the displacement of a mobile assembly over any distance with reference to a high-precision graduate rule of limited length (shorter than the distance of relative movement). The distance of the relative movement is typically several meters, possibly 10 m to 100 m or even more, and the length of the rule is 1 m.

To alleviate the above drawbacks, the invention proposes an interferometer delay line including a guide track extending over a given distance in a predetermined direction, an optical payload displaced along the guide track under the control of a control device including at least one sensing device adapted to sense the position of an assembly including the payload along the guide track and including at least one graduated rule parallel to the guide track, an optical read head supplying pulses representative of increments of the relative rule-head displacement, and a counter for counting the pulses. The control device further includes a drive device adapted to act at least indirectly on the payload under the control of a control system connected to the sensing device.

The sensing device includes, parallel to the guide track, a linear succession of optical read heads which are fixed, the graduated rule having a length at least equal to the greatest interval between heads and being carried by the optical payload in any position thereon facing at least one of the optical read heads. The control system connected to the sensing device further includes a synchronization/switching unit connected to the optical read heads and to the counter and is adapted to cause the counter to count pulses from the heads in succession.

It will be realized that this feature of the invention exists in attaching the rule to the mobile payload. The short rule moves in front of the fixed optical read heads. There are as many read heads as are required to cover all of the travel (whence the modular aspect). The spacing of the heads is less than or equal to the length of the rule; there is therefore an overlap distance in which the rule is read by two heads at a time: the active head n and the next head n+1 which takes over from the head n when the latter can no longer "see" the rule. During this overlap phase, both heads n and n+1 read the rule and the changeover is from head n to head n+1. It is obvious that the spacing between the heads is preferably constant, but the above discussion can be generalized to successive non-equal spacings provided that the rule is longer than the longest distance between heads.

This feature of the invention is surprising in that it would have been reasonable to assume that entirely different and much more sophisticated measuring techniques would have been required to achieve this level of accuracy for significantly greater distances (a few meters to a few tens of meters or even more), given that at present it is not possible with a rule + head combination to detect the position of a mobile with sufficient accuracy other than over a short distance (in the order of one meter).

The solution proposed hereinabove using a known graduated rule moving along a succession of known heads retains the performance of a single rule combined with a single head without introducing severe constraints with respect to the positioning of the heads parallel to the guide track, synchronizing the triggering of the heads, or switching between the channels on which the impulses to be counted by the counter arrive.

It is sufficient to know the instantaneous position of the payload with relatively low accuracy (for example to within one millimeter) in order to be able to determine in front of which head(s) the rule is located and therefore which head(s) must be activated at the time in question. The tolerance with respect to the positioning of each head relative to the neighboring heads (or relative to a reference point of the delay line) can be moderate (for example, in the order of one millimeter, or even greater) provided that this tolerance is small enough to guarantee that each head begins to "see" the rule before the previous head has stopped seeing the rule, so that there is a guaranteed minimum overlap when the rule moves on from one head to the next. Switching of the counter when an overlap is detected so that the counter stops counting pulses from one head in order to count pulses from the next head is not subject to severe constraints. It is sufficient that there is at least an overlap. The incidence of a phase-shift between the pulses generated by the two heads seeing the two ends of the rule at the same time remains low because any such phase-shift induces an error between the last pulse from the upstream head and the first pulse from the downstream head relative to the spacing between the two pulses from the same head which remains lower than this spacing. For example, for a rule 1.02 m long and with a maximal (or constant) spacing of 1.0 m between heads, there is an overlap of 2 cm, and if the pulses from the heads correspond to distance increments in the order of 15 nm, any phase-shift between the pulses delivered by successive heads causes a maximum error in the order of 15 nm per meter, which is entirely acceptable.

In accordance with the preferred features of the invention:

the distances between successive heads are the same, the rule has an active length of at least 1.001 times to 1.1 times the maximal distance between any two successive heads, the rule has a length of the order of 1 m, and the pulses supplied by the heads are representative of distance increments less than $10^{-7}$ m.

Another object of the invention, possibly independent of the first object, is to guide translational movement of an optical assembly, the translational movement of which controls the length of an optical path in an experiment, the experiment being preferably but not necessarily an interferometry experiment in which the quality of the results is directly dependent on control of translational movement for equalizing the lengths of two optical paths. The mobile assembly is simultaneously subject to guide forces which have disturbing effects (guidance noise) and to servocontrol drive forces. Guidance must impart minimal vibrational disturbance to the mobile assembly in the direction of translational movement and also in other directions.

In some cases (see in particular the previously mentioned European Patent 0,398,772) the payload is carried by a carriage which is mobile along the guide track, and the payload is connected to the carriage by a coupling constituting one stage of filtering of bearing noise in the direction of translational movement and made up of members which are flexible in the longitudinal direction (and rigid in lateral directions) to provide passive filtering of high-frequency longitudinal disturbances due to guidance noise.

The guidance techniques used until now are of the solid rubbing or rolling type.

Guiding the carriage by means of air cushions has also been proposed (see again the previously mentioned European Patent 0,398,772).

Prior art porous aerostatic pads are a priori well suited to vibration-free guidance because of their low level of mechanical noise. However, the air film is very thin (3 μm to 5 μm) and this imposes very severe geometrical constraints with respect to the guide tracks.

It is unrealistic to claim compliance with geometrical constraints in this order on guide tracks of great length (several meters or several tens of meters). Accordingly, using aerostatic pads would seem unrealistic for delay lines of great length.

To benefit from the advantages of these aerostatic pads over long distances, in a second aspect the invention proposes an interferometer delay line including a guide track extending over a given distance in a predetermined direction, an optical payload moved along the guide track under the control of a control device which includes at least one sensing device adapted to sense the position of an assembly including the payload along the guide track and a drive device adapted to act at least indirectly on the payload under the control of a control system connected to the sensing device, wherein the optical payload is supported on aerostatic pads having bearing planes parallel to the predetermined direction on a carriage mobile on the guide track, and wherein the drive device includes an actuator between the carriage and the payload for controlling the relative position of the payload parallel to the predetermined direction.

In addition to the fact that they do not cause any friction opposing relative translational movement between the payload and the carriage parallel to the guide direction, these aerostatic pads have proved capable of protecting the payload effectively against vibration of the carriage as it rolls or slides, even over great distances, without imposing the previously mentioned severe geometrical constraints on the guide track, over all of its length. In other words, the use of aerostatic pads only at the payload/carriage interface (over a small travel, for example in the order of a few millimeters) is seen as sufficient to obtain the advantages that might be expected of aerostatic support of the carriage over all of its travel.

The aerostatic pads preferably have bearing planes conjointly forming two planes parallel to the guide direction and inclined forward each other.

In accordance with another feature of the invention that is beneficial in itself, when there is a carriage supporting the payload (even if the payload is not supported on the carriage using aerostatic pads), the actuator acting between the payload and the carriage is at least indirectly controlled by the sensing device adapted to sense the position of the payload relative to the guide track by means of a first control loop receiving a position set point signal, and there is a second actuator between the carriage and an area fixed relative to the guide track. The second actuator is controlled by another position sensor adapted to sense the position of the payload relative to the carriage by means of a second loop preferably having a null set point so that the guide travels of the aerostatic pads (or other supports) and of the actuator remain centered.

Preferably, the second actuator is a drive wheel carried by the carriage and rolling on the guide track, the first control loop is also connected to an ancillary control loop including an accelerometer carried by the payload, and the actuator acting on the payload from the carriage is a loudspeaker coil type electromagnetic drive unit.

Objects, features and advantages of the invention emerge from the following description given by way of a non-limiting example with reference to the appended drawings.

DETAILED DESCRIPTION OF THE PREFERRED EMBODIMENTS

A stellar interferometer includes two telescopes receiving radiation from the same heavenly body (not shown). The telescopes include mirrors which direct the incident radiation to a wave recombination station in which are formed interference fringes characteristic of the radiation emitted by the heavenly body.

The problem is to continuously adjust the optical path in one arm of the stellar interferometer in order to compensate continuously for path differences d associated with variations in the position of the observed object in the sky and with external disturbances. The path difference to be compensated has the value $(B)\sin(z)$, where B is the distance between the telescopes and z is the zenith angle of the object. The optical path is adjusted in practice by inserting into one arm of the interferometer a so-called "delay line" device that is an optical retroreflector which is mobile in a direction D.

The required technical specifications for a delay line device are essentially dependent on the distance between the telescopes, the orientation of the line between the telescopes to the North-South axis, the position in the sky of the objects to be observed, the setting time over which the image of the interference fringes is integrated, and the accuracy required in measuring the contrast of the fringes. The essential specifications cover:

1. the linear travel of the mobile assembly of the delay line (a few meters),
2. the speed of displacement of the retroreflector (variable between zero and a few tens of millimeters per second),
3. the mean accuracy of positioning of the mobile assembly (retroreflector) (a few micrometers),
4. the dynamic accuracy of the positioning of the retroreflector relative to its mean position, i.e. the accuracy of the compensation for optical path differences: this dynamic accuracy is the most critical specification as it conditions the accuracy (a few percent) (with which the contrast of the fringes is measured) and is expressed as a mean-squared position error (a few nanometers) in a time window corresponding to the observation setting time (less than a second to a few minutes), and
5. the amplitude (from a few centimeters to a few micrometers, depending on the frequency) and the frequency (up to a few tens of Hertz) of the optical path differences to be corrected by the delay line.

Figure 1:
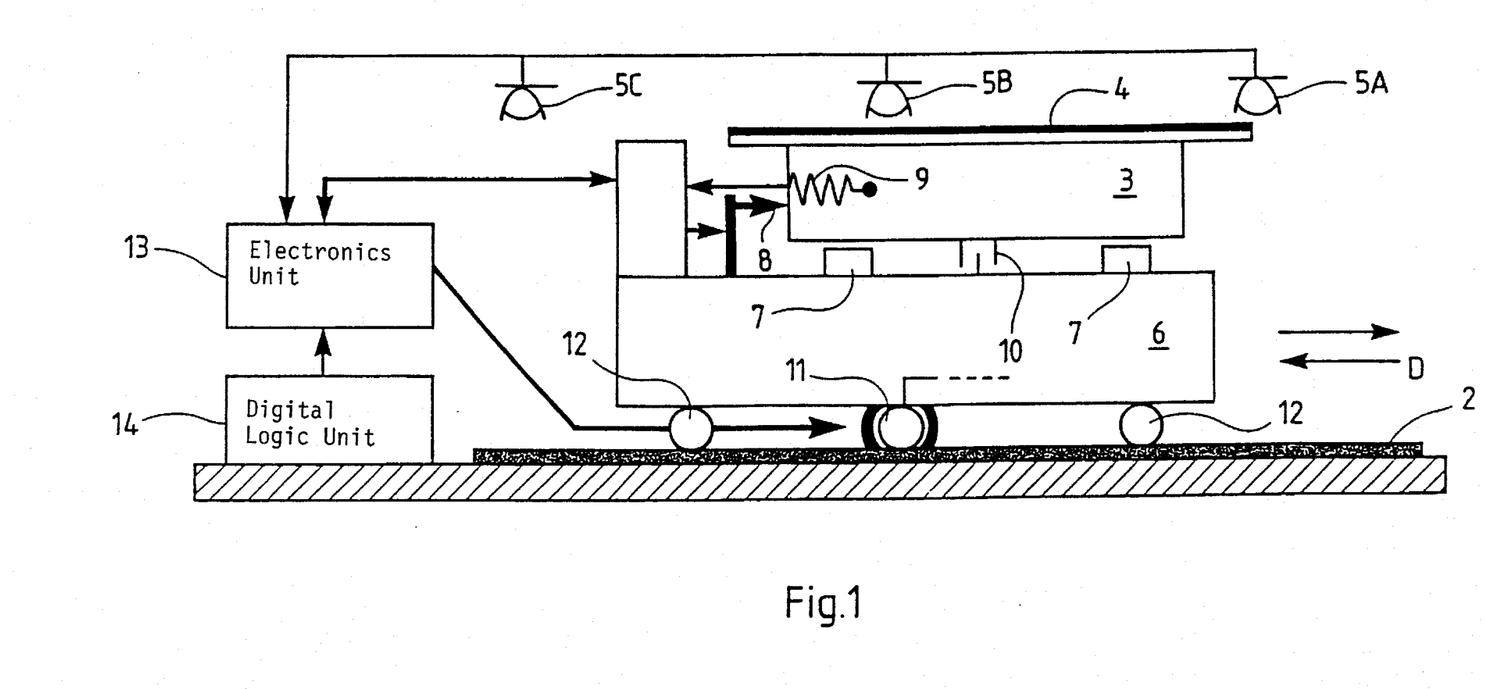
FIG. 1 is a general schematic of an interferometer delay line of the invention.

FIG. 1 shows a delay line 1 in accordance with one particularly beneficial embodiment of the invention, adapted to be integrated into an interferometer of the aforementioned type.

The delay line 1 includes:

a guide track 2 extending over a given distance (for example, a few meters or 30 meters to 50 meters, or even more) in the direction D;

an optical payload 3 which is mobile parallel to the guide track;

a sensing device adapted to sense the position of the optical payload along the guide track and including at least one graduated rule 4 parallel to the guide track and, parallel to the latter, a linear succession of optical read heads (three heads 5A, 5B and 5C are shown here although in practice there may be a much greater number of heads) fixed relative to the guide track and preferably at equal intervals; the length of the graduated rule 4 (for example 1.02 m) is slightly greater than the maximum distance between heads (for example 1 m), the graduated rule 4 is carried by the optical payload so that in any position of the payload it is facing at least one head;

a carriage 6 which is mobile along the guide track and carrying the optical payload 3 which is connected to it by a coupling which is advantageously in the form of aerostatic pads 7;

a first actuator 8 adapted to act between the optical payload and the carriage 6 and parallel to D;

an accelerometer 9 carried by the optical payload 3, the sensing axis of which is parallel to D;

a position sensor 10 adapted to sense the position of the optical payload 3 relative to the carriage;

a second actuator 11 adapted to displace the carriage along the guide track, in this example this is a drive wheel carried by the carriage and rolling on a portion fixed relative to the guide track; in this example the carriage is also supported by non-driven wheels 12, an electronics unit 13 connected by fixed or flexible lines as necessary to the optical read heads, to the first actuator, to the accelerometer, to the position sensor and to the second actuator; and a digital logic unit 14 connected to the electronics unit, an analog/digital converter and a digital/analog converter (not shown) being provided between these units.

The graduated rule (with graduations every 4 μm for example) is shown here on top of the optical payload 3, but it could instead be on one of the optical payloads lateral longitudinal sides or even underneath the optical payload, (there are many feasible configurations).

The optical read heads 5 have (either internally or in the electronics unit 13) processor systems generating pulses representative of increments in the relative distance between the graduated rule 4 and the heads in the order of $10^{-7}$ m at most, for example.

The graduated rules and the optical read heads are known in themselves; they are products marketed by HEIDENHAIN under product reference LIP 101, for example.

The aerostatic pads 7 are advantageously of the porous type; they are preferably attached to the carriage so that no vibration or spurious force can be transmitted to the optical payload 3 by the compressed gas supply lines (not shown) connected to the pads.

The aerostatic pads have bearing planes (i.e. interfaces with the optical payload) which are parallel to the direction D.

In FIG. 1 the aerostatic pads have horizontal coplanar bearing planes.

The aerostatic pads preferably have bearing planes conjointly forming two planes parallel to D but inclined to each other.

Figure 2:
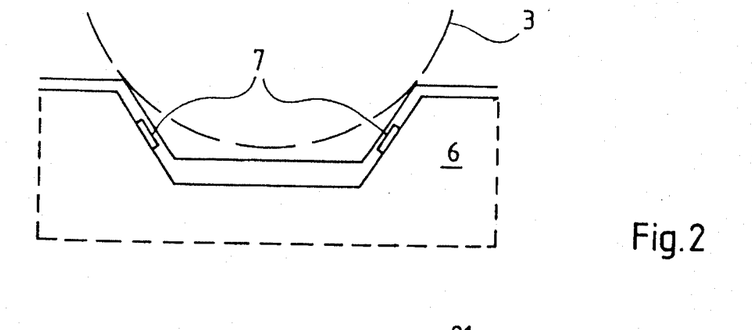
FIG. 2 is a diagrammatic view in transverse section of one embodiment of a carriage-payload systems.

In the FIG. 2 embodiment, for example, the carriage includes a longitudinal groove with a symmetrical trapezoidal section and the aerostatic pads are disposed on the groove flanks (and therefore with equal but opposite inclinations to the horizontal). This rigidly locates the cradle of the optical payload 3 with respect to five degrees of freedom, but offers no resistance to displacement parallel to D.

The linear first actuator 8 is preferably of the contactless type; it is advantageously a loudspeaker coil type electromagnetic drive unit.

The position sensor 10 is of any appropriate type; it is advantageously a linear variable differential transformer (LVDT). It is set up to output a null signal when the optical payload 3 is centered longitudinally on the carriages.

The longitudinal travel of the payload relative to the carriage is typically in the order of ±3 mm.

Figure 3:
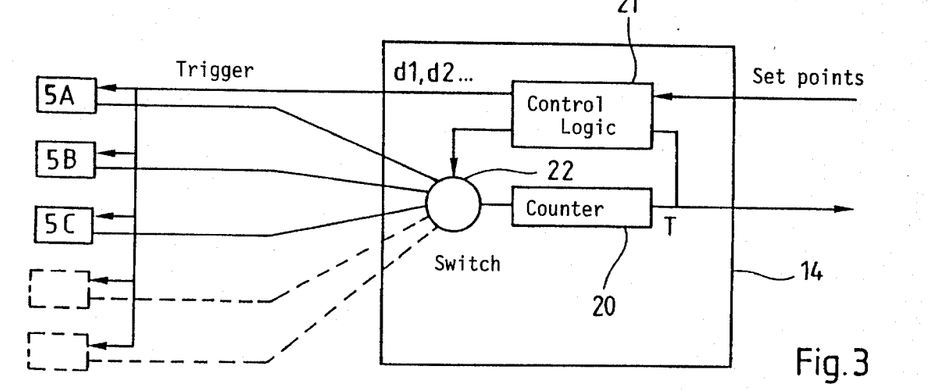
FIG. 3 is a functional block diagram of the sensing device from FIG. 1.

FIG. 3 is a schematic showing various functional units which, insofar as the hardware is concerned, are grouped together in whole or in part in the electronics and digital logic units 13 or 14 with respect to operation of the sensing device.

The digital logic unit 14 includes a counter 20, the output signal T of which gives a total increment, i.e. the distance of the optical payload 3 relative to a guide track reference.

This signal T is processed by control logic 21 which, in accordance with the instantaneous position, determines which optical read head(s) 5 to activate, over trigger lines d1, d2, etc, and the number of the optical read head from which pulses are to be counted at any time, with switching (at 22) from one head to another when the optical payload 3 is in a position for which it is known in advance (or can otherwise be determined) that the graduated rule 4 is moving out of the field of view of the first head and entering that of the second head.

Figure 4:
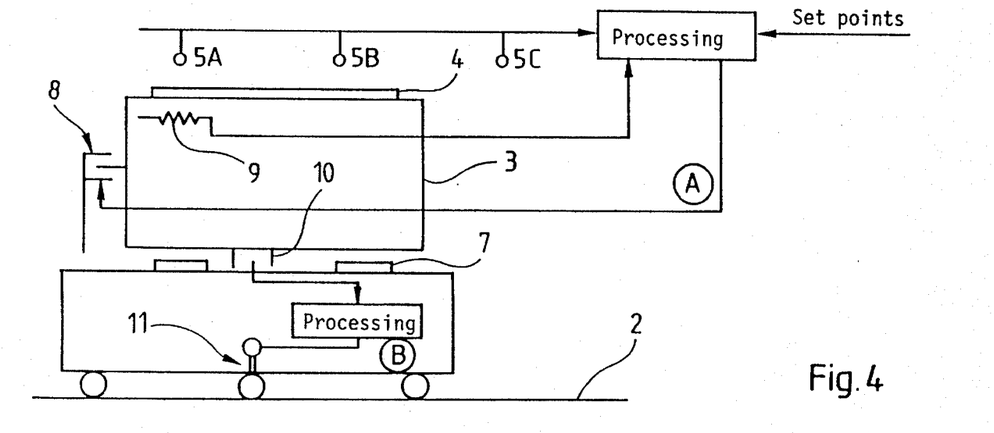
FIG. 4 is a functional block diagram of the control loops of the delay line from FIG. 1.

The actuators 8 and 11 are advantageously controlled by independent servocontrol loops, as shown in FIG. 4 in which these loops are represented from the functional point of view, without reference to their material implementation as shown in FIG. 1:

the first actuator 8 is activated by a first loop A receiving the measurement signals (pulse totals) from the sensing device 4+5A etc, the accelerometer signals, and a position set point signal; and the second actuator 11 is activated by a second loop B receiving the measurement signals from the LVDT, in such a way that these signals remain null signals (control with respect to a null set point).

The control laws are of any appropriate type.

A delay line, as described above, has been constructed as part of the LAROCA project of the Côte d'Azur conservatory with the following specifications:

travel: 3 m, rate of travel: 0.2 μm/s to 3 mm/s.

It is evident that this configuration can be extrapolated in modular fashion to much greater travels, and if necessary, it is sufficient to increase the length of the succession of optical read heads.

It goes without saying that the above description has been given by way of non-limiting example only and that the person skilled in the art can propose many variations thereof without departing from the scope of the invention.

There is claimed:

1. An interferometer delay line including a guide track extending over a distance in a predetermined direction, a carriage located on said guide track;

an optical payload carried on said carriage and adapted to be displaced along said guide track;

at least one aerostatic pad located between said carriage and said optical payload for supporting said optical payload with respect to said carriage; and a control device including at least one sensing device adapted to sense the position of an assembly including said optical payload along said guide track, said control device comprising:

at least one graduated rule located fixed with respect to and aligned parallel to said guide track;

a fixed linear succession of optical read heads located with respect to said guide track and communicating with said at least one graduated rule for supplying pulses representative of an increment of displacement of said at least one graduated rule relative to said linear succession of optical read heads, said at least one graduated rule having a length greater than the greatest length between two successive read heads of said linear succession of optical read heads, said at least one graduated rule being carried by said optical payload;

a counter connected with said optical read head for counting said pulses;

a synchronization/switching unit connected to said linear succession of optical read heads and to said counter and adapted to cause said counter to count pulses from said linear succession of optical read heads in succession; and a first actuator between said carriage and said optical payload for controlling the position of said payload relative to said carriage.

2. An interferometer delay line according to claim 1 wherein the distances between successive heads of said linear succession of optical read heads are the same.

3. An interferometer delay line according to claim 1 wherein said at least one graduated rule has an active length of at least 1.001 times to 1.1 times the maximal distance between any two successive optical read heads of said linear succession of optical read heads.

4. An interferometer delay line according to claim 1 wherein said at least one graduated rule has a length on the order of one meter.

5. An interferometer delay line according to claim 1 wherein said pulses represent increments of displacement less than $10^{-7}$ meters.

6. An interferometer delay line according to claim 1 further comprising two aerostatic pads having bearing planes conjointly forming two planes, said two planes being aligned parallel to said predetermined direction and inclined relative to each other.

7. An interferometer delay line according to claim 1 wherein said first actuator acting between said payload and said carriage is controlled by said at least one sensing device adapted to sense the position of said payload relative to said guide track by means of a first loop receiving a set point signal, said interferometer delay line further comprising:

a second actuator between said carriage and an area fixed relative to said guide track;

a position sensor on said carriage for sensing a position of said optical payload relative to said carriage by means of a second loop having a null set point.

8. An interferometer delay line according to claim 7 wherein said second actuator is a drive wheel carried by said carriage and rolling on said guide track.

9. An interferometer delay line according to claim 7 wherein said first control loop is also connected to an ancillary loop including an accelerometer carried by said payload.

10. An interferometer delay line according to claim 1 wherein said first actuator is a loudspeaker coil type electromagnetic drive unit.

11. An interferometer delay line comprising:

a guide track extending over a given distance in a predetermined direction;

a carriage mobile on said guide track;

a payload carried on said carriage;

a first actuator between said carriage and said payload for changing a position of said payload relative to said guide track;

at least one graduated rule aligned parallel to said guide track and carried by said payload;

a linear succession of optical read heads in communication with said at least one graduated rule for generating a plurality of pulses representative of an increment of a displacement of said at least one graduated rule relative to said linear succession of optical read heads, said first position sensor for controlling said first actuator and for sensing a position of said payload relative to said guide track;

a counter in communication with said linear succession optical read heads for counting said pulses;

a second actuator between said carriage and said guide track for moving said carriage on said guide tracks;

a second position sensor on said carriage for sensing a position of said payload relative to said carriage;

a synchronization/switching unit connected to said linear succession of optical read heads, said synchronization/switching unit connected to said counter;

at least one aerostatic pad located between said carriage and said payload for supporting said payload with respect to said carriage;

a drive device connected to said payload for controlling a position of said payload parallel to said predetermined direction; and a control system connected to said drive device for controlling said drive device.

* * * * *

UNITED STATES PATENT AND TRADEMARK OFFICE
CERTIFICATE OF CORRECTION

PATENT NO. : 5,610,717
DATED : March 11, 1997
INVENTOR(S) : LeBlanc et al.

It is certified that error appears in the above-identified patent and that said Letters Patent is hereby corrected as shown below:

Title page, item 75, kindly delete "Leblanc" and insert

---- LeBlanc ----.

Column 2, line 21, kindly delete "graduate" and insert

---- graduated ----.

Column 2, line 26, kindly delete "To alleviate the above drawbacks, the" and insert ---- The ----.

Column 3, line 44, after "invention" kindly delete the colon " : " and insert a comma ---- , ----.

Column 4, line 54, kindly delete "forward" and insert

---- toward ----.

Column 5, line 21, kindly delete "systems" and insert

---- system ----.

Column 5, line 23, after "FIG. 1;" kindly insert ---- and ----.

UNITED STATES PATENT AND TRADEMARK OFFICE
CERTIFICATE OF CORRECTION

PATENT NO. : 5,610,717
DATED : March 11, 1997
INVENTOR(S) : LeBlanc et al.

It is certified that error appears in the above-identified patent and that said Letters Patent is hereby corrected as shown below:

Column 6, line 42, kindly delete "this" second occurrence, and insert ---- the second actuator 11 ----.

Column 6, line 45, after "12" kindly delete the comma " , " and insert a semi-colon ---- ; ----.

Column 6, line 56, after "payload" kindly delete the comma " , ".

Column 8, line 7, after "direction," kindly insert ---- comprising: ----.

Column 8, line 61, after "said" second occurrence, kindly insert ---- optical ----.

Column 8, line 63, after "said" first occurrence, kindly insert ---- optical ----.

Column 8, line 67, after "track;" kindly insert ---- and ----.

Column 9, line 10, before "payload" kindly insert ---- optical ----.

UNITED STATES PATENT AND TRADEMARK OFFICE
CERTIFICATE OF CORRECTION

PATENT NO. : 5,610,717
DATED : March 11, 1997
INVENTOR(S) : LeBlanc et al.

It is certified that error appears in the above-identified patent and that said Letters Patent is hereby corrected as shown below:

Column 9, line 12, kindly delete "coil type" and insert

---- coil-type ----.

Column 10, line 7, after "succession" kindly insert ---- of ----.

Signed and Sealed this

Thirtieth Day of November, 1999

Attest:

Attesting Officer

Q. TODD DICKINSON

Acting Commissioner of Patents and Trademarks